United States Patent [19]

Paerisch et al.

[11] Patent Number: 4,702,518
[45] Date of Patent: Oct. 27, 1987

[54] SLIDING AND LIFTING VEHICLE ROOF WITH A SLIDING CANOPY PROVIDED WITH FLEXIBLE SCREENS

[75] Inventors: Jochen Paerisch, Herrenberg; Werner Herlemann; Gerhard Sweigart, both of Aidlingen; Hans Jardin, Inning/Ammersee; Alfons Lutz, Emmering, all of Fed. Rep. of Germany

[73] Assignees: Webasto-Werk W. Baier GmbH & Co., Gauting; Daimler-Benz Aktiengesellschaft, Stuttgart, both of Fed. Rep. of Germany

[21] Appl. No.: 800,551

[22] Filed: Nov. 21, 1985

[30] Foreign Application Priority Data

Nov. 22, 1984 [DE] Fed. Rep. of Germany ....... 3442617

[51] Int. Cl.$^4$ .............................. B60J 7/22; B60J 7/05
[52] U.S. Cl. .................................. 296/217; 296/214; 296/221; 98/2.14
[58] Field of Search ................ 296/211, 213, 216–218, 296/220–222, 214; 49/71; 160/40, 41, 92, 96; 98/2.14, 2.15, 99.3, 99.4

[56] References Cited

U.S. PATENT DOCUMENTS

| | | | |
|---|---|---|---|
| 1,603,182 | 10/1926 | Aborn | 296/216 X |
| 2,311,413 | 2/1943 | Persson | 160/80 X |
| 2,532,989 | 12/1950 | Biondi | 296/99 R X |
| 3,061,359 | 10/1962 | Pearlman | 296/26 |
| 3,960,404 | 6/1976 | Bienert | 296/213 |
| 4,566,730 | 1/1986 | Knabe et al. | 296/221 |

FOREIGN PATENT DOCUMENTS

| | | | |
|---|---|---|---|
| 3308065 | 9/1983 | Fed. Rep. of Germany . | |
| 0053227 | 3/1984 | Japan | 296/99 R |
| 2094723 | 9/1982 | United Kingdom | 296/221 |

Primary Examiner—Dennis H. Pedder
Attorney, Agent, or Firm—Sixbey, Friedman & Leedom

[57] ABSTRACT

Sliding and lifting roof for vehicles with a cover for closing an opening in a fixed roof surface, the cover being selectively liftable so as to raise its rear edge above the fixed roof surface or, after lowering of its rear edge, rearwardly slidable below the fixed roof surface. A sliding liner panel is provided that is slidable jointly with the cover and, at least partially, is also liftable together with the cover. For covering up of a gap between each lateral edge of the liftable liner panel part and a guide part which participates in the sliding movement but not in the lifting movement of the cover, there is provided a flexible screen. The screen is led around the lateral edge of the liftable liner panel part and is held taut in every position of the liner panel part.

18 Claims, 8 Drawing Figures

FIG. 3
FIG. 4
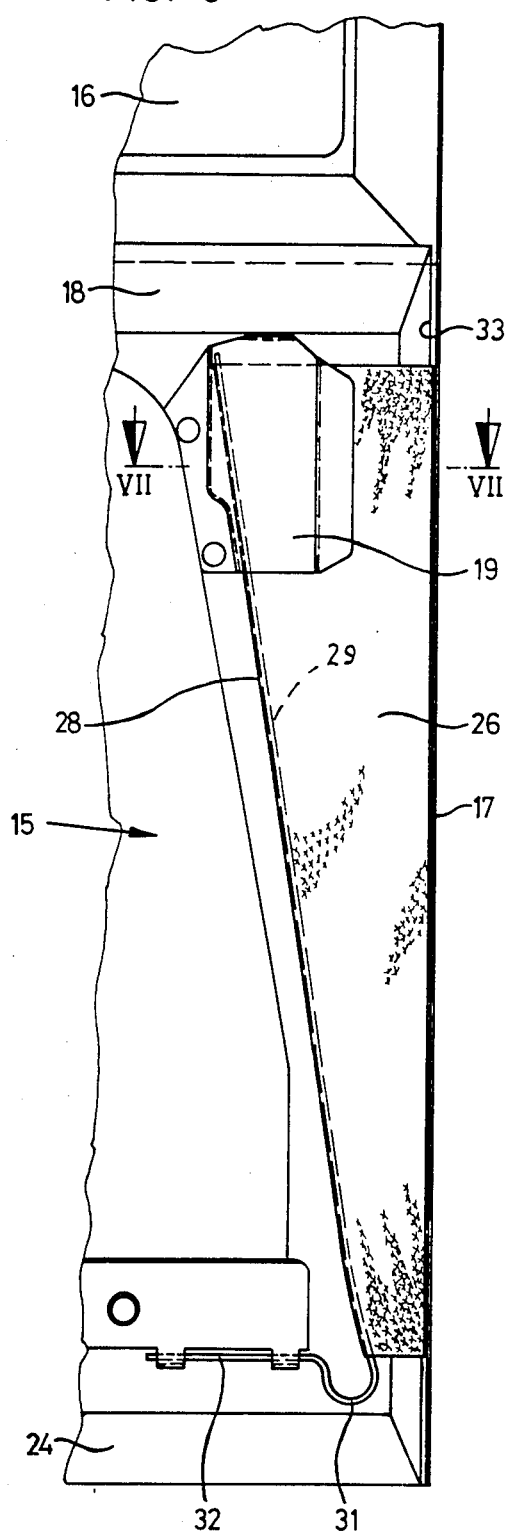
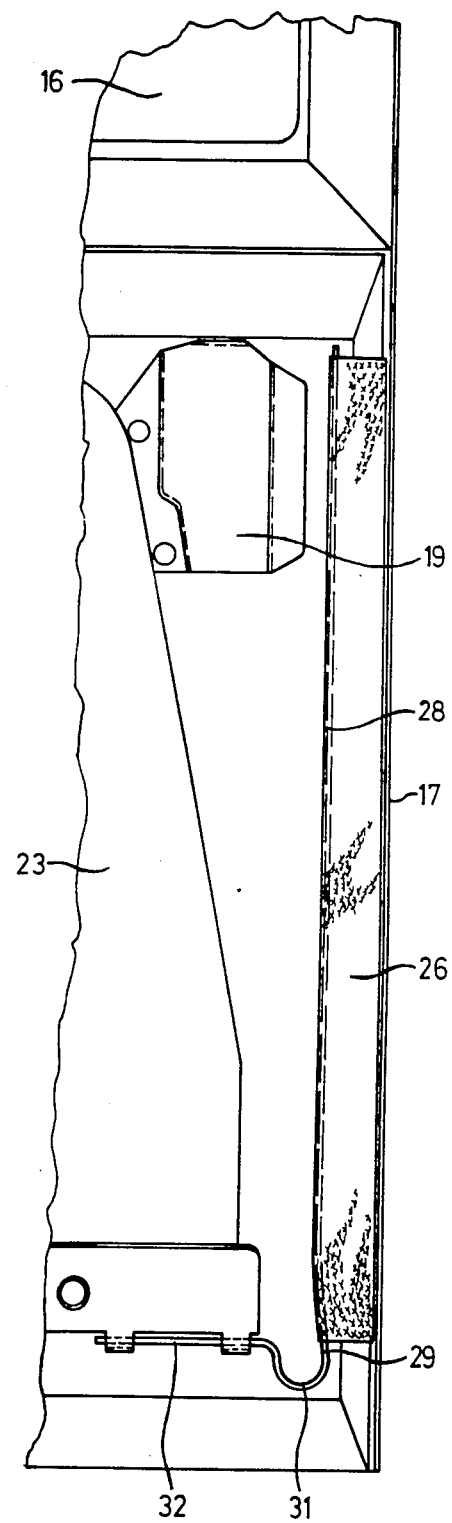

SLIDING AND LIFTING VEHICLE ROOF WITH A SLIDING CANOPY PROVIDED WITH FLEXIBLE SCREENS

BACKGROUND AND SUMMARY OF THE INVENTION

The invention relates to a sliding and lifting roof for vehicles with a rigid cover for closing an opening in a fixed roof surface, in a closed position, and which cover may be selectively lifted above the fixed roof surface at the rear edge or, after lowering of its rear end, slid rearwardly below the fixed roof surface. A sliding canopy or cover liner panel is provided that, at least partially, participates in the movement of the cover.

A sliding and lifting roof of this type has been known from the U.S. Pat. No. 3,960,404. One defect of the known arrangement is that in the case of the cover being lifted, the mechanisms located at both sides of the roof opening become at least partly visible. This is undesirable among other things for esthetic reasons.

To be sure, it has been known (German Offenlegungsschrift No. 33 08 065) to attach shields made of flexible material at both sides of the cover of a lifting and sliding roof so that whenever the cover is opened, the view of the raising mechanisms will be blocked. In that case, we are dealing, however, with an accordion-like folded bellows or with a strip of plastic clamped firmly at both its longitudinal edges on the cover sliding canopy which cannot be raised. Both solutions require a relatively large installation space in the direction running transversely to the sliding direction of the cover. In addition, undesirable deformation of the shields may occur under the influence of shocks or the like.

A transfer of this arrangement to a roof having a sliding canopy which may be at least partially raised, consequently, would be problematic, if not impossible due to a lack of installation space.

The invention, therefore, has a primary object of further developing a sliding and lifting roof of the initially mentioned type in such a way that, also, in the case of an at least partially raisable sliding canopy inside cover lining panel, the lifting mechanisms will remain invisible. At the same time, the arrangement should be made such that it will only use a particularly small amount of space in the direction extending transversely to the sliding direction of the cover. This object is achieved, in accordance with a preferred embodiment of the invention through the fact that a flexible screen is provided for covering up of the gap between the lateral edge of the sliding canopy which may be lifted and a guide part that participates in the sliding movement, but not the lifting movement, of the cover. A flexible screen is located at each side of the sliding cover liner panel which screen is stretched around the lateral edge of the part of the sliding liner panel which may be pushed out and/or is guided around the guide part, and is held taut by means of a tensioning arrangement in every position of said part of the sliding roof.

The taut, flexible screen requires a minimum of lateral installation space. Even under the influence of vehicle shocks, it maintains its position as provided and thus, maintains protection against the hidden mechanisms becoming visible. Because the screen is held taut continuously, at the same time it contributes to accident safety because it will prevent, for example, that children will reach into the lifting mechanism.

In a preferred additional feature of the invention, each of the screens is fixed with one of its longitudinal edges on the respective guide part; the tensioning arrangement, at the same time, is disposed on the upper side of the raisable part of the liner panel and is connected with the other longitudinal edge of the screen which is guided around the lateral edge of the part of the sliding liner panel. The clamping arrangement may, in this way, be housed particularly simply in a space-saving manner that is invisible from the inside of the vehicle. A constructive and particularly elegant solution will be obtained, whenever each of the screens is wedge-shaped and the clamping arrangement has a spring wire coupling with a leg on which the other longitudinal edge of the screen has been attached and which in one position is pretensioned in a resilient manner in which it forms, with the adjoining lateral edge of the raisable part of the sliding roof, an acute angle opening rearwards essentially in the plane of the part of the sliding liner panel. With such a spring wire coupling, one will be able to hold the screen uniformly taut in practically every position. The spring wire coupling, on its part, requires only very little installation space.

Effectively, the spring wire coupling has a leg extending essentially transversely to the shifting direction of the cover, which leg is attached to the raisable part of the sliding liner panel close to its forward edge.

At the rear end of the part of the sliding headliner panel, a lifting bracket, extending beyond the rear part of the one leg in the closed position of the cover, may be attached so as to form a stop for that leg.

The flexible screen may consist basically of any desired material which has sufficient flexibility and durability. Preferably, the screen is made of cloth.

In the case of the guide parts, drag links may be used which connect a rear part which cannot be raised with the front end of the part of the sliding roof which may be raised, similar to the connecting rods of U.S. Pat. No. 3,960,404.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 shows an enlarged top view of the part of the sliding roof which lies in the area indicated by a dash-dot line in FIG. 2, wherein a liftable part of the sliding liner panel is in a lowered position;

FIG. 4 shows a top view according to FIG. 3 wherein the liftable part of the sliding liner panel is raised;

DETAILED DESCRIPTION OF THE PREFERRED EMBODIMENT

Figure 1:
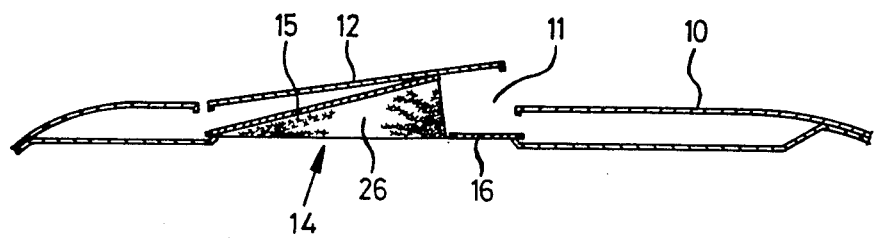
FIG. 1 shows a schematic longitudinal section through a sliding and lifting roof according to the invention taken along the line I—I of the FIG. 2 with the cover lifted up.
Figure 2:
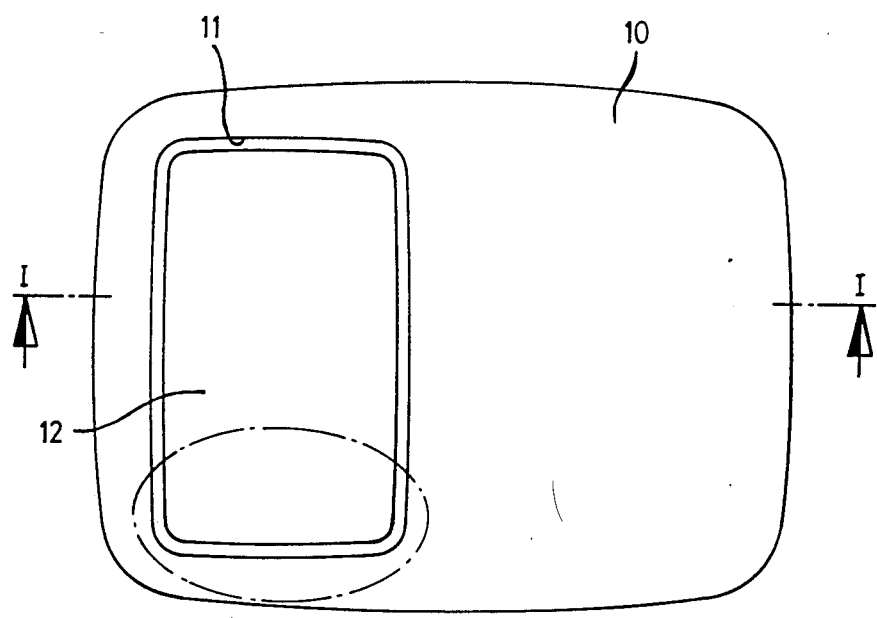
FIG. 2 shows a top view of the roof according to FIG. 1.

As becomes clear from FIGS. 1 and 2, an opening II has been provided in a fixed roof surface 10, which opening may be closed or at least partially opened by means of a rigid cover 12. The cover 12, in the area of its forward edge, is guided at both sides of the roof opening 11, for example, by a guide element that is slidingly shiftable on a longitudinal guide, and it is mounted to pivot about an axis running transversely to the sliding direction of the cover. The cover is connected with a lifting mechanism in an area lying rearwardly at a distance from the forward edge of the cover. Selectively, the cover may be pivoted so as to lift its rear edge above the fixed roof surface 10 (FIG. 1) or it may be slidingly shifted, after lowering of its rear edge, below a rear area of the fixed roof surface. For achieving such movement, any desired means known per se (for example, that according to the German Offenlegungsschrift No. 32 38 454 and corresponding U.S. application Ser. No. 530,716, filed Sept. 9, 1983, now U.S. Pat. No. 4,566,730 the text of which is incorporated by reference) may be provided so that no detailed explanation is required here.

Under the cover 12, a sliding cover liner panel 14 is disposed which has a forward part 15 which can be lifted out along with cover 12 and a rear part 16 which cannot be lifted with cover 12. The parts 15, 16 of the sliding liner panel are always connected one with the other, at both sides of the sliding roof 14, by way of a drag link 17 that serves as a guide for the liner panel that participates in the cover's sliding movement, but not its lifting movement. As indicated previously, such an arrangement may be constructed similar to that of U.S. Pat. No. 3,960,404 wherein horizontal roof guides 33 are used to enable the same type of sliding movement of the lateral members 17 with the cover, while precluding their participation in the cover lifting movement. Thus, since, as also noted, the guide part formed by the link 17 (that is schematically represented in FIG. 3) corresponds to connecting rod members 18 of U.S. Pat. No. 3,960,404, reference may be had to that patent for a more detailed description of a known guidance arrangement by which an equivalent sliding without lifting movement can be achieved. The part 15 of the sliding roof which may be lifted is pivotable, with regard to the rear part 16 of the sliding liner panel and the drag link 17 about an axis lying near its front end. For this purpose, lifting brackets 19 are attached on both sides of part 15, close to its rear end 18 which may be lifted. These brakcets 19 are connected by way of swivel arms 20 (FIG. 7) with the lifting mechanism of the cover 12 which has not been illustrated (brackets 19 corresponds to brackets 54 of commonly assigned U.S. patent application Ser. No. 800,410, filed on even date with this application, and to which reference may be had for a more detailed description of the lifting mechanism and the manner in which brackets 19 may be used to raise part 15). The part 15 of the liner panel lies essentially in a plane with the rear part 16 of the sliding roof when cover 12 is closed or has its rear edge lowered. Whenever the cover 12 is lifted out, then the front part 15 of the sliding liner panel will be swung relative to its rear part 16, into the position illustrated in FIG. 1. The liner panel canopy 14 also participates in the sliding movement of cover 12. For this purpose the liner panel 14 is connected with the cover 12 in the area of its forward end, in a manner not shown in detail.

Figure 7:
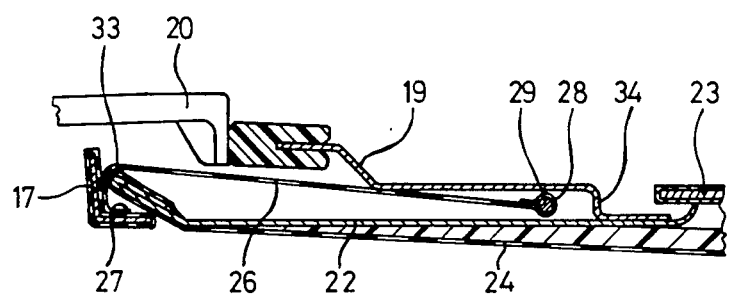
FIG. 7 shows a sectional view taken along the line VII—VII of the FIG. 3, in an enlarged scale.

In the illustrated embodiment, the part 15 of the liner panel 14 has a rectangular frame 22, for example made of sheet metal, which carries a plate 23. The frame 22 and the plate 23 are covered from below with inside roof lining material as indicated at 24 (FIG. 7). In a corresponding manner, it will also be possible for the rear sliding roof part 16 to consist of a frame 25 covered with cloth material matched to the roof lining. The lifting brackets 19 are welded or otherwise effectively secured to the frame 22.

At both sides of the part 15 of the liner panel 14 there is a wedge-shaped flexible screen, which is made preferably of cloth. One longitudinal edge 27 of the screens 26 is attached to a respective drag link 17. For example, edge 27 is glued to said drag link 17 or a cloth covering of the drag link. The other longitudinal edge 28 of each screen 26 is secured wrapped around a leg 29 of a respective spring wire coupling 31, which extends longitudinally the entire length of the screen 26. The two spring wire couplings 31 are seated on the top side of the part 15 of the canopy. Couplings 31 have an additional leg 32 extending essentially transversely to the sliding direction of cover 12 by way of which leg they are connected firmly with frame 22 in the vicinity of the forward edge of the part 15. The legs 29, 32 of the spring wire coupling 31 are formed by a metal strip that has been bent in such a way that the rearward end of each spring wire coupling, in its relaxed state, attempts to move inwardly away from the adjoining lateral edge 33 of the part 15 in a direction toward the longitudinal center axis of the canopy. However, the inward movement is limited when the leg 29 strikes against a shoulder 34 of the bracket 19 so that leg 29 forms an acute angle relative to an adjacent lateral edge 33 that opens rearwardly, essentially in the plane of the part 15 of the liner panel 14.

Figure 5:
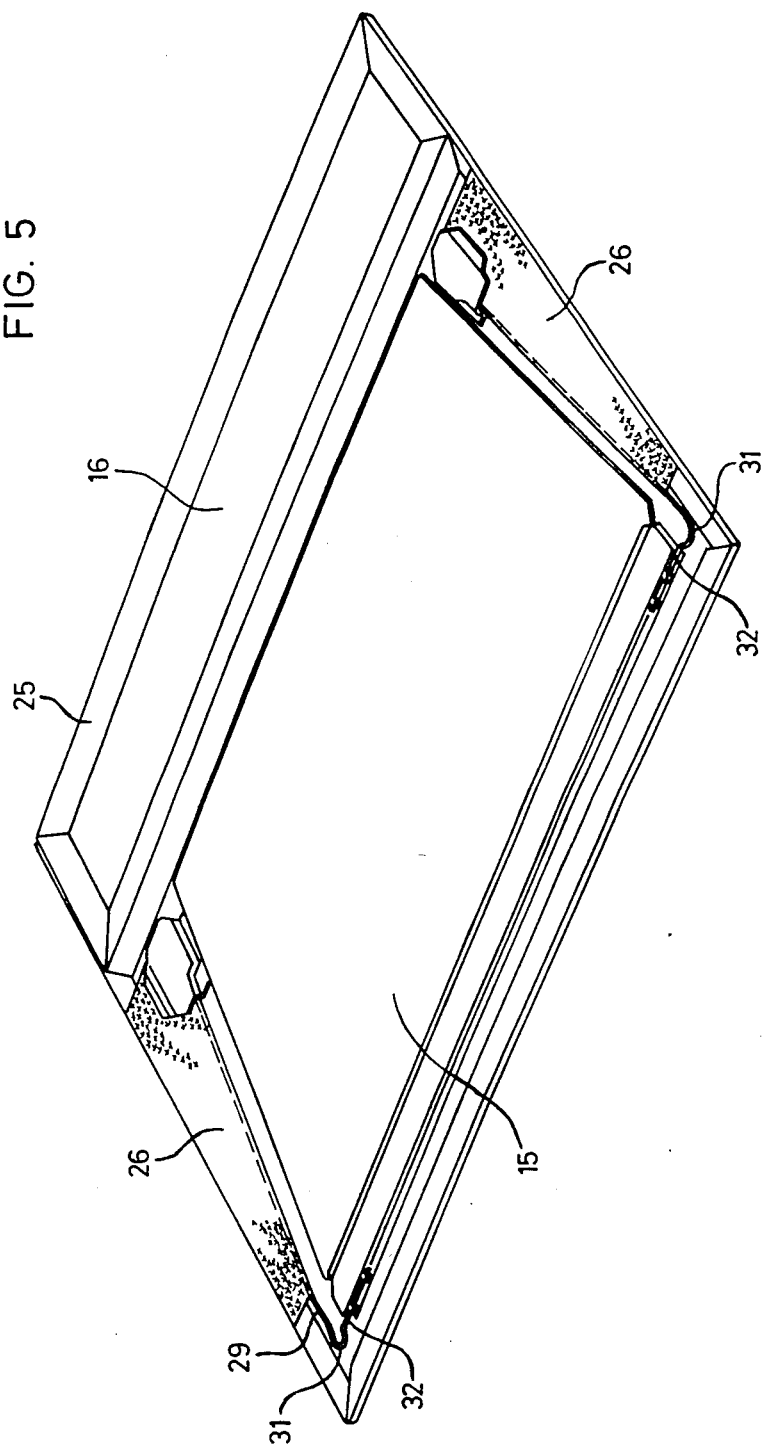
FIG. 5 is a perspective view of the sliding headliner panel for the operating position according to FIG. 3.
Figure 6:
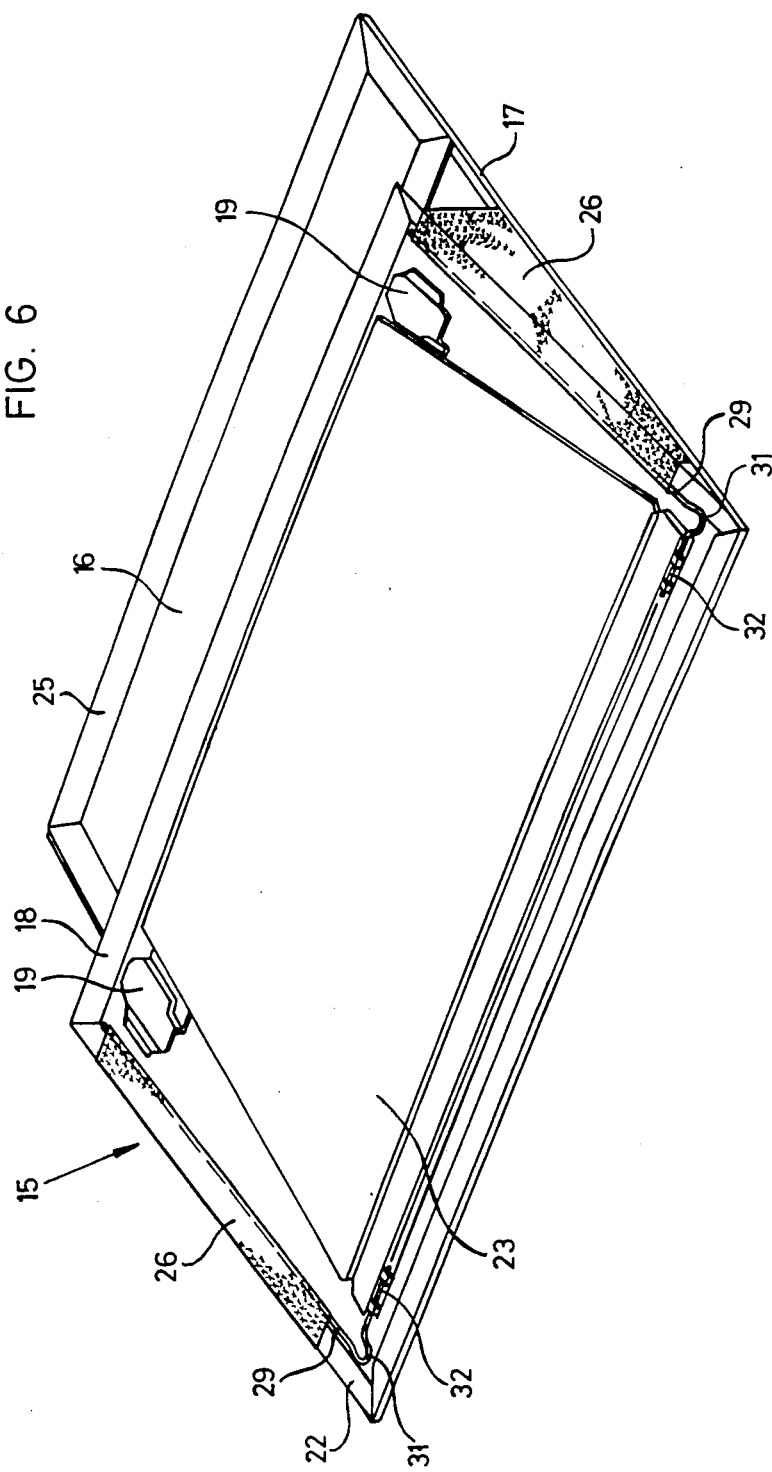
FIG. 6 is a perspective presentation similar to FIG. 5 for the operating position according to FIG. 4.

Under the influence of the spring wire coupling 31, the respective screen 26 is pulled around the lateral edge 33 of the part 15 of the liner panel and is pulled inward on the upper side of the part 15. As a result of that, the wedge-shaped screen 26 is continuously pulled taut. In the lowered position of the part 15 (FIGS. 3, 5 and 7), the major portion of the screen 26 is situated above the part 15, and legs 29 of the spring wire couplings 31 fit against the shoulder 34 of the brackets 19. Whenever the cover 12 is lifted and the part 15 of the liner panel 14 is made to follow by way of the swivel arms 20 and the brackets 19, a pull is exerted on the screens 26. The legs 29 of the spring wire coupling 31 are resiliently deflected to the outside in the direction toward the lateral edge 33 of the part 15 until they arrive in a position that is essentially parallel to the lateral edge 33 (FIGS. 4 and 6). When the part 15 is lowered, the legs 29 of the spring wire coupling 31 return into the position according to FIGS. 3, 5 and 7, whereby they enter into a space, together with the rear end of the screen 26, defined by the frame 22 below and on top by a part of a bracket 19 that juts out over the frame 22 (cf. especially FIG. 7).

It is readily apparent that the tensioning arrangement is not limited to the embodiment illustrated. For example, it will be possible that, instead of the spring wire coupling 31, rubber bands or other spring elastic tensioning members may be provided so as to connect the longitudinal edges 28 of the screens with each other in a manner so as to exert an inward pull on these edges.

Figure 8:
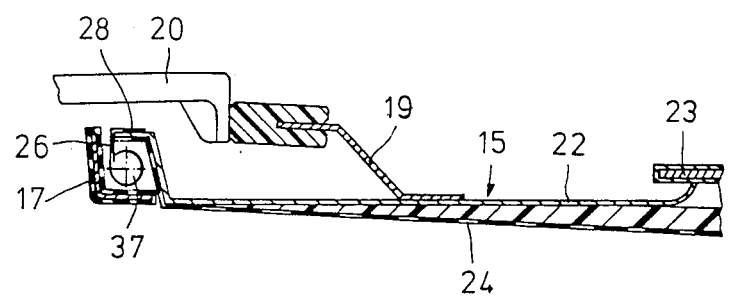
FIG. 8 shows a sectional view similar to FIG. 7 of a modified embodiment.

In the modified embodiment of FIG. 8 longitudinal edge 28 of screen 26 is secured to the lateral edge of tiltable part 15 of liner panel 14, whereas the other longitudinal edge (not shown) of screen 26 is fastened to a roller 37. Roller 37 is rotatably mounted on drag link 17 and is spring-biased in a direction of rotation (counterclockwise direction in FIG. 8) tending to wind up screen 26 on roller 37, whereby screen 26 is continuously pulled taut. In the lowered position of part 15 (FIG. 8), the major portion of screen 26 is wound up on roller 37. Whenever cover 12 and part 15 are moved into upwardly tilted positions, screen 26 is unwound from roller 37 against spring force.

It is also possible to move each of longitudinal edges 27, 28 of screen 26 affixed to respective tensioning means, such as to spring wire coupling 31 and to spring-biased roller 37, respectively.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. Sliding and lifting roof for vehicles with a cover for closing an opening in a fixed roof surface in a closed position thereof, said cover being selectively liftable by raising of its rear edge above the fixed roof and rearwardly slidable after lowering of its rear edge below the fixed roof surface, and a slidable cover liner panel situated below the cover, said liner panel being liftable, at least in part, jointly with said cover, wherein a flexible screen is provided between each of longitudinally extending lateral edges of the slidable liner panel, along the length of the liftable part of the liner panel into proximity with a rear end thereof, and a guide part for the liner panel that participates in the sliding movement but is prevented from participating in the lifting movement of the cover, each said flexible screen being guided around a respective lateral edge of the part of the liner panel which may be lifted, and a tensioning arrangement is provided for holding each flexible screen taut in every position of the liftable part of the sliding liner panel, wherein each of the screens has a longitudinal edge fixed to a respective said guide part, and the tensioning arrangement is disposed on an upper side of the liftable part of the liner panel and is connected with another longitudinal edge of the screen, and wherein each of the flexible screens has the shape of a wedge, and the tensioning arrangement is a spring wire coupling strip with a generally longitudinally oriented leg on which the other longitudinal edge of the screen has been looped around and which is resiliently tensioned into a position in which it forms, together with an adjoining lateral edge of the liftable part of the liner panel, a rearwardly opening acute angle lying essentially in the plane of the liftable part of the liner panel.

2. Sliding and lifting roof as in claim 1, wherein the spring wire coupling has a second leg extending essentially transversely to the sliding direction of the cover, said second leg being attached to the liftable part of the liner panel in the vicinity of its forward edge.

3. Sliding and lifting roof as in claim 2, wherein a brakcet is provided close to the rear end of the liftable part of the liner panel said bracket extending laterally beyond a rear portion of said longitudinal leg of the wire coupling in the closed position of the cover so as to form a stop for said longitudinal leg.

4. Sliding and lifting roof as in claim 1, wherein a bracket is provided close to the rear end of the liftable part of the liner panel, said bracket extending laterally beyond a rear portion of said longitudinal leg of the wire coupling in the closed position of the cover so as to form a stop for said longitudinal leg.

5. Sliding and lifting roof as in claim 4, wherein the flexible screens are formed of cloth.

6. Sliding and lifting roof as in claim 5, wherein the guide parts are drag links which connect a rear part of the liner panel that is only slidably displaceable with a front end of the liftable part of the liner panel.

7. Sliding and lifting roof as in claim 1, whereint he flexible screens are formed of cloth.

8. Sliding and lifting roof as in claim 2, wherein the flexible screens are formed of cloth.

9. Sliding and lifting roof as in claim 3, wherein the flexible screens are formed of cloth.

10. Sliding and lifting roof as in claim 2, wherein the guide parts are drag links which connect a rear part of the liner panel that is only slidably displaceable with a front end of the liftable part of the liner panel.

11. Sliding and lifting roof as in claim 3, wherein the guide parts are drag links which connect a rear part of the liner panel that is only slidably displaceable with a front end of the liftable part of the liner panel.

12. Sliding and lifting roof as in claim 4, wherein the guide parts are drag links which connect a rear part of the liner panel that is only slidably displaceable with a front end of the liftable part of the liner panel.

13. Sliding and lifting roof for vehicles with a cover for closing an opening in a fixed roof surface in a closed position thereof, said cover being slectively liftable by raising of its rear edge above the fixed roof and rearwardly slidable after lowering of its rear edge below the fixed roof surface, and a slidable cover liner panel situated below the cover, said liner panel being liftable, at least in part, jointly with said cover, wherein a flexible screen is provided between each of longitudinally extending lateral edges of the slidable liner panel and a guide part for the liner panel that participates in the sliding movement but is prevented from participating in the lifting movement of the cover, each said flexible screen being guided over a respective lateral edge of the part of the liner panel which may be lifted, and a tensioning arrangement is provided for holding each flexible screen taut in every position of the liftable part of the sliding liner panel, wherein said tensioning arrangement comprises a strip of spring wire having a leg that is substantially straight and oriented generally longitudinally, each said flexible screen being secured at one longitudinal edge directly upon said leg in a manner resiliently tensioning the spring wire strip, wherein said strip is resiliently deflectable due to increases and decreases of said tensioning so as to cause said leg to swing toward and away from a lateral edge of the liftable part of the liner panel as said liftable part of the liner panel is raised and lowered.

14. Sliding and liftng roof according to claim 13, wherein said strip of spring wire is bent to form said leg and an additional leg, said resilient tensioning acting against an inherent resilient biasing force of the bend which attempts to swing the leg upon which the screen is secured inwardly toward said additional leg.

15. Sliding and lifting roof as in claim 13, wherein the flexible screens are formed of cloth.

16. Sliding and lifting roof as in claim 14, wherein the flexible screens are formed of cloth.

17. Sliding and lifting roof as in claim 13, wherein the guide parts are drag links which connect a rear part of the liner panel that is only slidably displaceable with a front end of the liftable part of the liner panel.

18. Sliding and lifting roof as in claim 14, wherein the guide parts are drag links which connect a rear part of the liner panel that is only slidably displaceable with a front end of the liftable part of the liner panel.

* * * * *